2,864,753
CYANIDE OF SOLUBLE BLUE AND METHOD OF USING SAME

Lyman Chalkley, Prince Georges County, Md.

No Drawing. Application July 1, 1957
Serial No. 668,930

3 Claims. (Cl. 204—158)

The present invention relates to a hydrophilic p-amino triphenylmethane dye cyanide and, more particularly, to the cyanide of the dye, Soluble Blue, Colour Index No. 707.

It has long been known that certain of the triphenylmethane dyes which contain at least one amino group para to the central methane carbon atom form colorless cyanides which, in the presence of suitable organic activators become photosensitive to ultraviolet and shorter wave lengths of light to produce colored compounds but which are not sensitive to light in the visible range. Because of this property, the substances may be used in solution and absorbed or coated on a suitable base in the presence of an activator for the recording and measurement of ultraviolet radiation. Expensive equipment, such as quartz spectrographs and photoelectric meters, is ordinarily used to isolate this region.

Papers prepared from one of the photosensitive compounds and an activator therefor may be used in photographic and photoduplication processes to print out images that are fully formed without development, that may be permanent and that may be examined in ordinary interior illumination without fixing. The papers employed retain their ultraviolet sensitivity after the printing of one image so that other portions may be printed on at a later date.

However, all of the known p-amino triphenylmethane dye cyanides have been hydrophobic in nature and are not activated by water so as to provide useful systems photosensitive to ultraviolet and shorter wave lengths.

I have found that new compounds which comprise p-amino triphenylmethane dye cyanides having in the molecule at least one hydrophilic group, such as the sulfonic acid, quaternary ammonium or hydroxyl group, are hydrophilic in character and that the potential sensitivity to ultraviolet radiation possessed by the known hydrophobic dye cyanides is not lost in the new compounds. In fact, unlike the previous hydrophobic p-amino triphenylacetonitriles, the new compounds are activated by water alone. It will be understood, of course, that more than one type of hydrophilic group may be present in the same molecule of dye cyanide. The p-amino groups may be primary, secondary, or tertiary, in nature. The present invention relates to such dye cyanides having at least one sulfonic acid group in the molecule, the position or positions of such group corresponding specifically to those of the parent dye, Soluble Blue. The dye cyanides of the invention are represented by the following structural formula

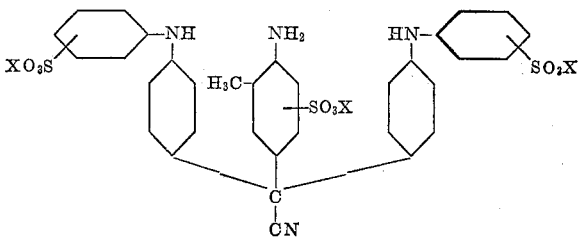

wherein X is a cation.

The sulfonic acid group is a highly ionized salt-forming radical. The essential part of the dye cyanide containing this group comprises the ion, $RSO_3^-$. This ion, because of its strongly hydrophilic character, confers the desired hydrophilic properties upon the triphenylacetonitrile. However, the ion alone, of course, does not constitute a complete neutral molecule and, therefore, the sulfonic ion is always combined with an ion of opposite charge in a complete molecule. Thus, the sulfonic ion is combined with a cation, which may be hydrogen or a metallic ion or ammonium.

The nature of the cation with which the sulfonic ion is combined is not at all critical. In aqueous solution in which these triphenylacetonitriles are photosensitive, the sulfonic acid group is largely ionized and the cation is no longer even a part of the molecule under the conditions in which the dye cyanides are utilized to take advantage of their photochemical properties. Therefore, any cation may be used with the sulfonic acid group to prepare a satisfactory hydrophilic dye cyanide.

For matters of convenience, selected ions are combined with these groups. Thus, the salts of the sulfonic acids groups are generally quite soluble in water. In order to obtain compounds which crystallize well, certain cations for the sulfonic acid group, such as sodium, potassium, calcium, strontium, and barium have been utilized especially.

It is the object of the present invention to provide a new p-amino triphenyacetonitrile which is hydrophilic and is activated by water to form a colored compound on exposure to ultraviolet and shorter wave lengths.

Another object of the invention is to provide a new hydrophilic dye cyanide which upon irradiation with ultraviolet energy of suitable wave length in the presence of a suitable activator will yield directly a permanent true blue color.

A further object of the invention is to provide a new hydrophilic dye cyanide which can be used as a sensitizer for printing papers and the like, to provide materials which yield directly upon exposure to ultraviolet energy of a suitable wave length a permanent blue image having the hue of the conventional blueprint and requiring no further processing.

Still another object of the invention is to provide a photochemical process employing the present new compound.

I have prepared the cyanide of Soluble Blue, Colour Index No. 707, and have found it to have unexpectedly advantageous properties which make it particularly valuable for use in actinometry and for photographic and photocopying applications. Soluble Blue is one of the bluest of the triamino triphenylmethane dyes.

The previously known hydrophobic dye cyanides and the other more recently discovered hydrophilic dye cyanides, disclosed in my copending application Serial Number 550,773, filed December 2, 1955, now abandoned, have failed to supply a sensitizer that would yield a true blue image. The cyanides of the Patent Blue group, such as Patent Blue V Cyanide, Xylene Blue VS Cyanide, Erio Glaucine Cyanide, yield cyan images of a greenish-blue hue, whereas the known and newly discovered cyanides of the triamino triphenylmethane dyes, such as Crystal Violet Cyanide and Formyl Violet Cyanide, yield images of distinctly violet hue. Previous attempts have been made to prepare a photosensitive dye cyanide that would yield a blue image on irradiation, but have been unsuccessful.

It has now been found that the particular phenylated blue dye, Colour Index No. 707, "Soluble Blue" can be converted into a cyanide that when properly used, is strongly photosensitive and yields a pure blue image.

All of the p-amino dye cyanides previously found to be strongly photosensitive have contained either primary amino groups or amino groups substituted with alkyl groups. In the dye, Soluble Blue, the amino groups are directly substituted with phenyl groups to which it is believed that the sulfonic acid group or groups are attached. Victoria Blue, another triphenylmethane dye having p-amino groups directly substituted with an aromatic group, the aromatic group in this instance being a naphthyl group, forms a hydrophobic dye cyanide which can be prepared only with difficulty, and even in alcohol solution under ordinary conditions is almost insensitive to radiation and much too slow for most uses to which photosensitive materials would be put. Soluble Blue, on the other hand, readily forms a cyanide which has been found to be extremely useful in production of photosensitive materials.

Soluble Blue Cyanide, sulfonated phenylated triamino triphenylacetonitrile, is prepared as the neutral sodium or calcium salt of the sulfonic acid. This is very soluble in water. The solution at pH 6 colors blue on intense irradiation with ultraviolet, but is not strongly photosensitive and is very strongly phototropic, the blue color fading in an hour at room temperature. If, however, waterleaf paper, glue-sized paper, polyvinyl alcohol-sized paper, etc., are coated with the neutral aqueous Soluble Blue Cyanide salt solution and dried, as disclosed in my copending application Serial Number 542,479, strongly photosensitive materials are produced that print out a pure blue image that is permanent and does not fade at all in the dark. That a strong, nonphototropic image is formed is surprising because neutral solutions of the parent dye, Soluble Blue, are almost colorless and in textile use the color has to be developed by an acid treatment after the "dye" has been applied to the fiber. (See R. Nietzki, "Chemie der Organischen Farbstoffe," 5th edition, published by Julius Springer, Berlin, 1906, pages 169-170.)

In contrast to this behavior of the preformed dye, when the dye cyanide is first combined with the cellulose or other hydrocolloid and then converted into the dye by irradiation, the newly formed dye is immediately fixed permanently in the colored form without need for further acid treatment.

Because of this unexpected property, papers sensitized with Soluble Blue Cyanide may be processed as easily as other dye cyanide materials; and Soluble Blue Cyanide may be combined with other dye cyanides to give combined sensitizations with their already known advantages of greater selectivity to spectral regions, image hues not provided by the single sensitizers, and faster printing speed under some conditions. The images on paper sensitized with Soluble Blue Cyanide match blueprints in hue, yet print out directly and can be used for many purposes without further processing.

A method for the preparation of Soluble Blue Cyanide is given below, although it is to be understood that other methods may be used.

*Example 1*

A solution of 5 g. of National Aniline "Aniline Blue" Certified Biological Stain (a commercial form of the dye Soluble Blue, Colour Index No. 707), in 75 ml. of boiling water is placed in a pressure bottle with 1 g. of 95% sodium cyanide, the bottle sealed and heated to 100° C. for 1 hour in the dark. After heating, the bottle is cooled, opened and the solution filtered from a trace of tar. The filtrate, under a hood, is made just acid with 64% sulfuric acid and evaporated to dryness in vacuo at 30° C. The residue is dissolved in 50 ml. of water and shaken with 100 ml. of i-propyl alcohol, whereupon two layers are formed and separate on standing. The upper alcoholic layer is decanted, the lower aqueous layer extracted with two 20 ml. portions of i-propyl alcohol which are added to the first alcoholic layer. The alcoholic extract is then evaporated to dryness, leaving the sodium salt of the dye cyanide as an amorphous glassy material. This is readily soluble in water to form a photosensitive solution which turns blue on exposure to radiation of wave lengths shorter than 3300 A.

*Example 2*

Pure filter paper, 20-pound weight, is impregnated by dipping in a 0.5% aqueous solution of Soluble Blue Cyanide sodium salt, prepared as in Example 1, and is dried in the dark. On exposure to wave lengths shorter than about 3400 A. the paper prints out a permanent blue image requiring no fixing or other processing.

This application is a continuation-in-part of my copending application, Serial Number 550,773, filed December 2, 1955, and of my copending application, Serial Number 542,479, filed October 24, 1955.

I claim:

1. A dye cyanide having the formula

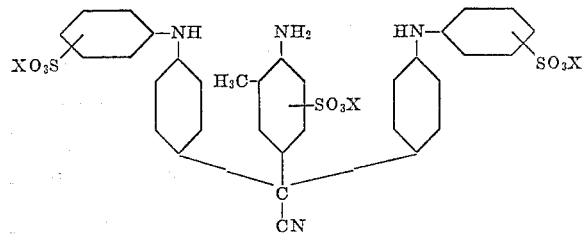

wherein X is a cation.

2. A dye cyanide having the formula

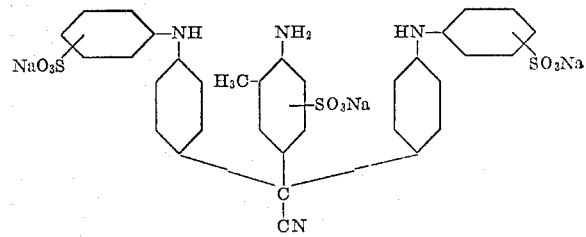

3. A process for forming a colored compound comprising irradiating with ultraviolet energy in the presence of an activator consisting of water, a dye cyanide having the following formula

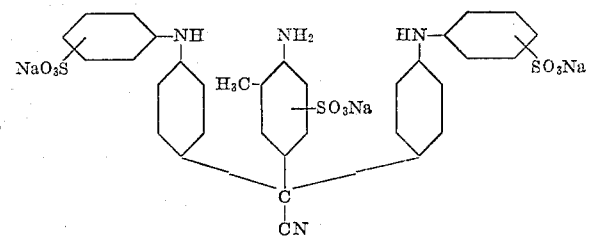

References Cited in the file of this patent

UNITED STATES PATENTS

| 2,441,561 | Chalkley | May 18, 1948 |
| 2,676,887 | Chalkley | Apr. 27, 1954 |

OTHER REFERENCES

Colour Index, January 1924, No. 707.
Harris et al.: J. A. C. S., vol. 57 (1935), pp. 1151–1159.